United States Patent [19]

Wilson et al.

[11] Patent Number: 5,757,724
[45] Date of Patent: May 26, 1998

[54] ZERO VELOCITY TOWED ARRAY SYSTEM

[75] Inventors: Douglas H. Wilson, Mystic; Robert Hauptmann, Groton, both of Conn.

[73] Assignee: The United States of America as represented by the Secretary of the Navy, Washington, D.C.

[21] Appl. No.: 914,021

[22] Filed: Aug. 12, 1997

[51] Int. Cl.$^6$ ............................................. G01S 3/80
[52] U.S. Cl. ............................................. 367/130
[58] Field of Search ........................... 367/130, 106, 367/16, 20; 114/242

[56] References Cited

U.S. PATENT DOCUMENTS

| | | | |
|---|---|---|---|
| 3,978,813 | 9/1976 | Pickens et al. | 367/20 |
| 4,004,265 | 1/1977 | Woodruff et al. | 367/130 |
| 4,999,816 | 3/1991 | Dale et al. | 367/4 |

*Primary Examiner*—Daniel T. Pihulic
*Attorney, Agent, or Firm*—Michael J. McGowan; Prithvi C. Lall; Michael F. Oglo

[57] ABSTRACT

A zero velocity towed array system for use in an ocean environment includes a towed array subsystem and a deployment vessel. The towed array subsystem comprises a rear drogue, an elongated communication cable having mounted thereon at least one, acoustic sensor. The deployment vessel deploys the towed array subsystem. While the deployment vessel moves in a forward direction through the ocean environment at a selected forward motion rate, it deploys the acoustic sensor and communication cable rearwardly at a deployment rate corresponding to the forward motion rate, thereby to maintain the acoustic sensor and communication cable in a stable position in the ocean environment.

7 Claims, 1 Drawing Sheet

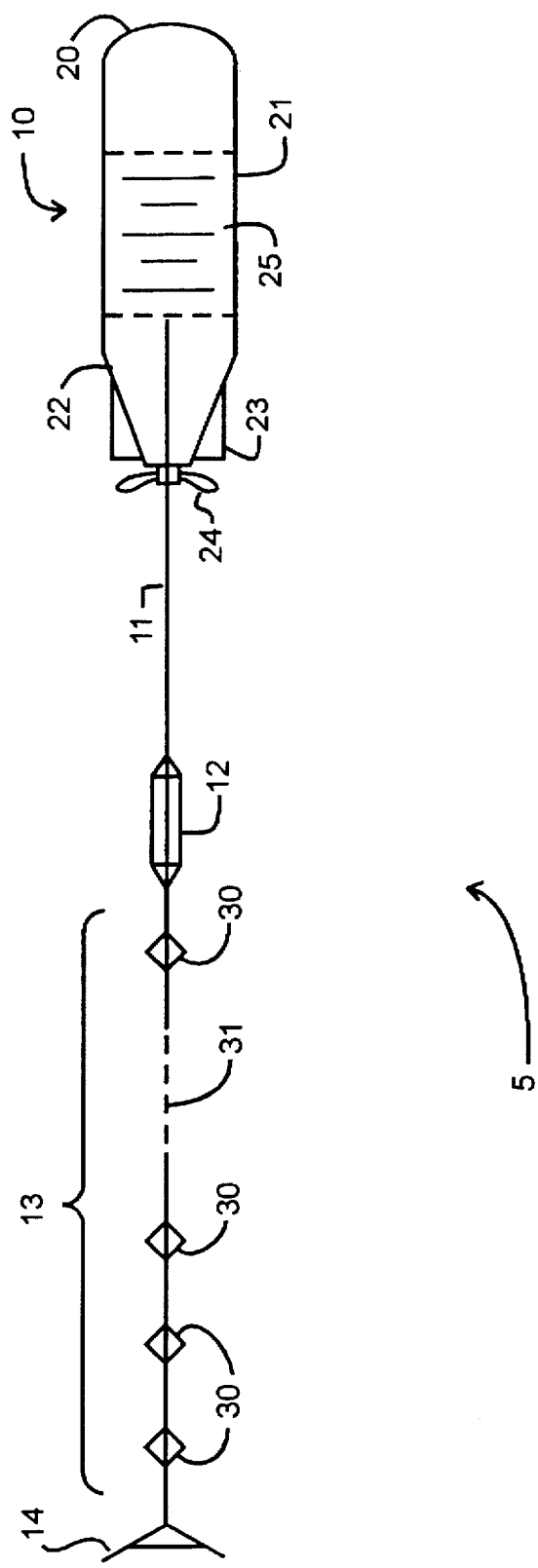

5,757,724

ZERO VELOCITY TOWED ARRAY SYSTEM

STATEMENT OF GOVERNMENT INTEREST

The invention described herein may be manufactured by or for the Government of the United States of America for Governmental purposes without the payment of any royalties thereon or therefor.

CROSS REFERENCES TO RELATED PATENT APPLICATIONS

The instant application is related to a U.S. patent application entitled: DUAL ZERO VELOCITY TOWED ARRAY SYSTEM (Navy Case No. 75936) U.S. patent application Ser. No. 08/914,022 having same filing date of Aug. 19, 1997.

BACKGROUND OF THE INVENTION

1. Field of the Invention

The invention relates generally to the field of sensors for sensing acoustic signals in an ocean environment, and more particularly to towed acoustic sensor array systems.

2. Description of the Prior Art

In, for example, seismic imaging and other similar operations in an ocean environment, sonar devices are generally towed in an array behind towing vessels or "platforms," such as ships, over an area to be imaged. The array may comprise a one-dimensional array, in which the sonar devices are attached to a single cable and allowed to stream behind the towing platform. Alternatively, the array may comprise a two-dimensional array, in which a plurality of cables are provided, all of which are to be towed behind the towing platform, and which are to be separated horizontally by selected distances.

Previous towed arrays were attached to the towing vessel by a fixed length cable, and are pulled through the water at the same rate as the towing vessel is moving. The arrays are generally constructed to minimize the amount of noise that is generated while they are being towed, including use of an outer hose, an interior stand-off layer, a distributed hydrophone as an acoustic sensor, and a fluid or solid fill material that fills the space between the hydrophone and the outer hose. These elements tend to result in an enlarged diameter for the hose, which, in turn, requires larger volumes on the towing vessel for storage prior to deployment or after retrieval. In a typical array, the outer hose is generally on the order of several inches in diameter, and a hundred feet long, whereas towing cables can be less than an inch in diameter and thousands of feet long. The storage volume required for both the towing cable and the array includes both the volume required for the towing cable as well as the volume that is required for the array.

SUMMARY OF THE INVENTION

It is therefore an object of the invention to provide a new and improved towed array system which moves at zero velocity, thereby reducing the amount of noise generated during towing and minimizing the diameter of the array.

In brief summary, the zero velocity towed array system for use in an ocean environment includes a towed array subsystem and a deployment vessel. The towed array subsystem comprises a rear drogue, an elongated communication cable having mounted thereon at least one acoustic sensor. The deployment vessel deploys the towed array subsystem. While the deployment vessel moves in a forward direction through the ocean environment at a selected forward motion rate, it deploys the acoustic sensor and communication cable rearwardly at a deployment rate corresponding to the forward motion rate, thereby to maintain the acoustic sensor and communication cable in a stable position in the ocean environment, avoiding generation of noise that would otherwise be generated by movement of the sensor through the ocean.

BRIEF DESCRIPTION OF THE DRAWINGS

This invention is pointed out with particularity in the appended claims. The above and further advantages of this invention may be better understood by referring to the following description taken in conjunction with the accompanying drawing, which schematically depicts a zero velocity towed array system constructed in accordance with the invention.

DESCRIPTION OF THE PREFERRED EMBODIMENT

With reference to the drawing, a zero velocity towed array system 5 constructed in accordance with the invention is depicted. The towed array system 5 includes a forward deployment vessel 10, a communications cable 11, a telemetry subsystem 12, a towed array 13 and a rear drogue 14, all of which will be situated in an ocean environment. During an acoustic information gathering session, during which the towed array will gather acoustic information from the ocean environment and provide it to the deployment vessel 10, the deployment vessel 10, moving in a forward direction (toward the right as shown in the drawing) deploys the towed array 13 (along with the rear drogue 14), telemetry subsystem 12 and communications cable 11, in that order, generally at a speed that corresponds with the speed of its (that is, the deployment vessel's) forward motion. The rear drogue 14 resists forward motion, and so the towed array will remain generally stationary as the deployment vessel 11 moves forward during the session. Since the towed array 13 is not pulled through the ocean environment during the session, noise which would otherwise be generated thereby will during deployment will be reduced.

The deployment vessel 10 generally has a torpedo-shaped hull, including a blunt forward nose 20, a side wall 21, and a tapering rear portion 22, from which may extend one or more stabilizing fins generally identified by reference numeral 23. A propeller 24, which is driven by an motor (not shown) interior of the hull. Also interior of the hull (or exterior to if so desired) is a storage compartment 25 for the towed array 13 and communications cable 11, and deployment machinery (not shown) for deploying the towed array and communications cable 11. The deployment machinery which is used for deploying the towed array and communications cable is conventional in the art and will not be described herein. The deployment machinery will deploy the towed array and communications cable at substantially the same rate as the forward speed of the deployment vessel 10 during an acoustic information gathering session.

The communications cable 11 may be any conventional cable used for communications in an ocean environment, including one or more media capable of transferring electrical or optic signals, surrounded by suitable insulating material.

The towed array 13 comprises a plurality of hydrophones, generally identified by reference numeral 30, which are connected to the telemetry subsystem 12 by a communications cable 31. The communications cable 31 used in the towed array may be similar to the communications cable 11, including one or more media capable of transferring electrical or optical signals, surrounded by a suitable insulating material. One or more of the signal transfer media may be provided for each of the hydrophones, or all of the hydrophones may transmit acoustic information signals over the same signal transfer medium, in, for example, a time multiplexed manner, using different carrier frequencies, or the like. During an acoustic information gathering session, the telemetry subsystem 12 will receive the signals from the hydrophones 30 and couple them onto the communications cable 11 for transmission to the deployment vessel 10. It will be appreciated that, if the communications cable 31 of the towed array 13 has the same structure as the communications cable 11, no telemetry subsystem 12 need be provided.

In operation, during an acoustic information gathering session, the deployment vessel 10 will be propelled in a forward direction (to the right as shown in the drawing) by its propeller 24. During such forward motion, the deployment machinery will deploy, from the storage compartment 25, first the rear drogue 14, followed by the towed array 13, the telemetry subsystem 12 (if present) and communications cable 11, with the deployment being at approximately the same rate rearwardly as the forward motion of the deployment vessel 10. The rear drogue 14 will resist forward motion of the towed array 13, thereby maintaining the towed array 13 in approximately the same position throughout the acoustic information gathering session, at least until the communications cable 11 is completely deployed. During the acoustic information gathering session, the hydrophones 30 of the towed array can detect acoustic information signals and provide them to the deploying vessel 10 over the communications cables 31 and 11 for study.

It will be appreciated that, when the communications cable has been completely deployed, continued forward motion of the deployment vessel will generally overcome the resistance provided by the rear drogue 14, in which case the towed array 13 will be dragged along with the deployment vessel 10. At that point, the acoustic information gathering session may be terminated, due to the likelihood of the noise generated by the motion of the towed array through the ocean environment.

After the acoustic information session has been completed, the deployment machinery aboard the deployment vessel 10 may retract the communications cable 11, telemetry subsystem 12 (if provided), towed array 13 and drogue 14 for storage in the storage compartment 25. Thereafter, the zero velocity towed array system 5 will be in condition to repeat the above-described operations for another acoustic information gathering session. If only one acoustic information session is desired, the retraction need not be accomplished. Instead the array, tow cable and other deployed components can be jettisoned by cutting the tow cable or providing a weak link in the tow cable which will separate the array and deployed components from the tow vessel after complete deployment.

The invention provides a number of advantages. In particular, it provides a zero velocity towed array system 5 for gathering acoustic information, that substantially reduces the amount of noise that would otherwise be generated in the acoustic information if the towed array were pulled by the deployment vessel. Since the noise is reduced, the acoustic information can be better detected and processed.

Additionally, as the zero velocity towed array system 5 and communications cable 11 remain stationary relative drag load is placed on the deployment vessel. Elimination of drag allows more options in array geometry. In particular, higher gain arrays may be practical applications where drag loads would have previously prevented their use.

A number of modifications may be made to the zero velocity towed array system 5 as depicted in the drawing. For example, the hydrophones 30 can be a standard piezoelectric, machined, fiber optic or other device for sensing changes in acoustic pressure, and may be lumped (that is, at specific locations along the towed array 13) or distributed along the towed array 13. In addition, as indicated above, the communications cables 11 and 31 may comprise any medium or media for transferring electrical or optical signals, and preferably should be small in diameter.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A zero velocity towed array system for use in an ocean environment comprising:
   a towed array subsystem comprising a rear drogue, an elongated communication cable having mounted thereon at least one acoustic sensor; and
   a deployment vessel for deploying the towed array subsystem, the deployment vessel moving in a forward direction through said ocean environment at a selected forward motion rate and deploying the at least one acoustic sensor and communication cable rearwardly at a deployment rate corresponding to the forward motion rate, thereby to maintain at least one acoustic sensor and communication cable in a stable position in the ocean environment.

2. A towed array system as defined in claim 1 in which said at least one acoustic sensor comprises a hydrophone.

3. A towed array system as defined in claim 1 comprising a plurality of acoustic sensors along said communication cable.

4. A towed array system as defined in claim 3 in which at least some of said acoustic sensors comprise hydrophones.

5. A towed array system as defined in claim 1 in which at least one acoustic sensor generates electrical signals, and said communication cable conducts said electrical signals generated by said at least one acoustic sensor to said deployment vessel.

6. A towed array system as defined in claim 1 in which said at least one acoustic sensor generates optical signals, and said communication cable conducts said optical signals generated by said at least one acoustic sensor to said deployment vessel.

7. A towed array system as defined in claim 1 further comprising a telemetry subsystem connected to said communication cable for receiving acoustic information from said at least one acoustic sensor and coupling said acoustic information to said deployment vessel.

\* \* \* \* \*